United States Patent [19]
Schindler

[11] 3,935,733
[45] Feb. 3, 1976

[54] ELECTRONIC TRANSMISSION DYNAMOMETER

[75] Inventor: Earle R. Schindler, New Orleans, La.

[73] Assignee: Resco, Inc., New Orleans, La.

[22] Filed: Nov. 14, 1974

[21] Appl. No.: 523,772

[52] U.S. Cl. ................................. 73/136 A
[51] Int. Cl.² ............................... G01L 3/10
[58] Field of Search ................ 73/136 A, 70.1

[56] References Cited
UNITED STATES PATENTS

| | | | |
|---|---|---|---|
| 2,586,540 | 2/1952 | Holden | 73/136 A |
| 2,947,168 | 8/1960 | Yang | 73/136 A |
| 3,604,255 | 9/1971 | Bart | 73/136 A |
| 3,762,217 | 10/1973 | Hagen | 73/136 A |
| 3,871,215 | 3/1975 | Pratt, Jr. et al. | 73/136 A |

FOREIGN PATENTS OR APPLICATIONS

| | | | |
|---|---|---|---|
| 968,503 | 9/1964 | United Kingdom | 73/136 A |
| 765,787 | 1/1957 | United Kingdom | 73/136 A |
| 1,134,343 | 12/1951 | France | 73/136 A |

*Primary Examiner*—Ruehl Charles A.

[57] ABSTRACT

A dynamometer in which a signal generator provides a repetitive signal of adjustable frequency, to record-playback heads fixed adjacent to similar magnetic recording mediums that are non-magnetically mounted and spaced axially apart on a drive shaft rotating without loads. Simultaneous recordings are made by the heads on the mediums and the signal generator switched off. With the rotating shaft loaded, the recordings are played back by the axially spaced recording-playback heads, and a phase difference between the recorded signal from each head is a measure of torque on the shaft. The frequency of recorded signal from either head is a measure of the speed of rotation of the shaft. The playback signals drive an electronic computer of well know design that multiplies the measure of torque by the measure of speed of rotation to provide a voltage proportional to shaft horsepower to a voltmeter that may be calibrated to read directly in horsepower given the elastic modulus of shaft material and shaft dimensions. In an excessively vibrating shaft, record-playback heads are mounted rigidly with respect to each other on a cradle that rides on the shaft and is held in place against turning with the shaft by springs attached to convenient fixed points.

2 Claims, 4 Drawing Figures

ELECTRONIC TRANSMISSION DYNAMOMETER

BACKGROUND OF THE INVENTION

1. Field of the Invention

The invention relates to dynamometers and more particularly to electronic dynamometers for measuring the power and speed of rotating drive shafts.

2. Description of Prior Art

Heretofore twist in a shaft due to torsion has been measured from precisely aligned index and reference marks spaced axially apart on the shaft when unloaded. Mechanical alignment of the marks limited the accuracy of alignment and their number and thus the results obtained.

SUMMARY OF THE INVENTION

An object of the invention is to provide electronically aligned reference markers that are in absolute alignment, a condition that can only be approximated by mechanically aligned reference and index markers.

Another object of the invention is to provide a cradle for carrying electronic record-playback heads in fixed axially spaced relationship and adapted to ride on a rotating drive shaft to eliminate erroneous results due to shaft vibration.

DETAILED DESCRIPTION

Referring to the figures, the invention comprises record and playback apparatus 10 mounted on and around a drive shaft 12 for magnetically recording a sinusoidal signal of a convenient frequency thereon as said shaft is rotated once without load. An electronic computer 14 is electrically connected to continuously receive the playback of the recorded signal from said shaft as it is rotating under load for providing electronic outputs proportional to shaft torque and horsepower and speed of rotation. Readout instruments are electrically connected to receive the outputs of electronic computer 14 for displaying them in terms of torque, horsepower and revolutions per minute.

Figure 1:
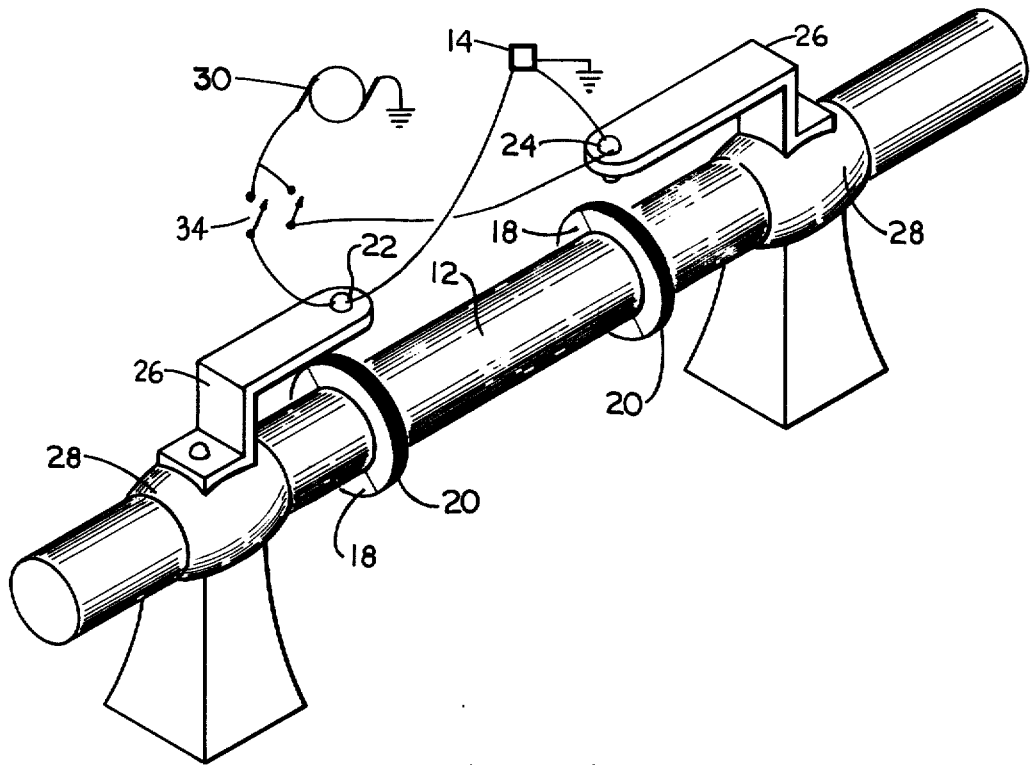
FIG. 1 is a three dimensional view from above the elements of the invention operably installed on a section of drive shaft.
Figure 2:
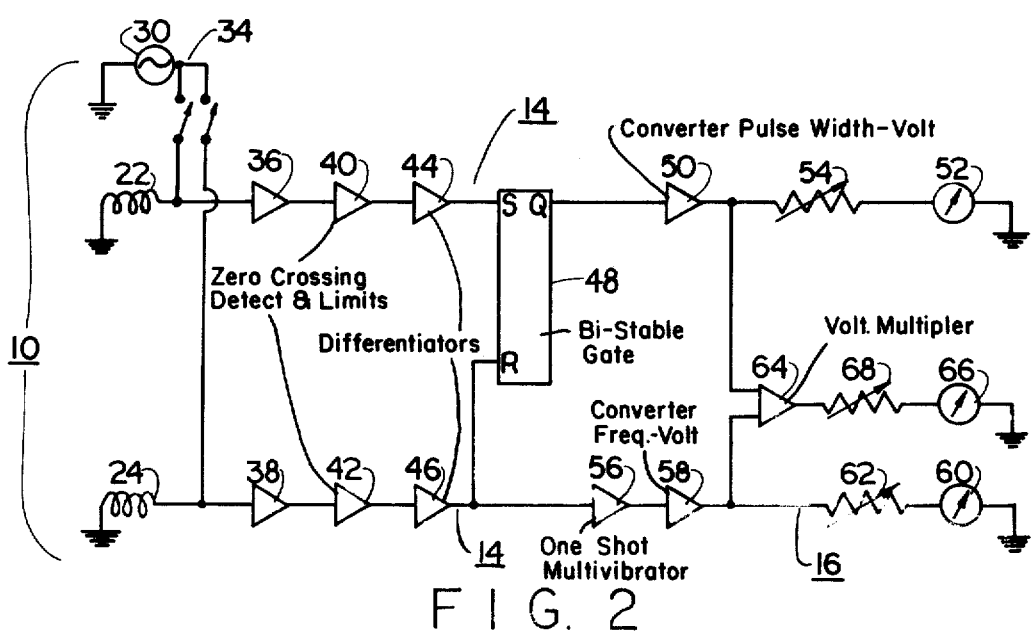
FIG. 2 is a simplified block diagram of the electronic circuitry of the invention.

Referring to FIGS. 1 and 2, record and play apparatus 10 comprises a pair of non-magnetic collars 18 fixed to drive shaft 12, the collars being spaced axially apart thereon for rotation therewith. Magnetic tapes 20 are mounted on and around the peripheries of respective collars 18. Record-playback heads 22 and 24 are mounted in respective mounting assemblies 26 with said heads positioned over respective collars 18 and rigidly secured in place to respectively adjacent shaft bearing housings 28. A signal generator 30 is connected through leads 32 and an off-on switch 34 to record playback heads 22 and 24, the head 22 being nearer to the shaft source of power end than head 24 which is nearer the shaft output end.

In operation switch 34 is turned to "on" and signal generator 30 provides a periodic signal of a choosable frequency (chosen as explained hereinafter) which is simultaneously recorded by the respective heads 22 and 24 on tapes 20 mounted on respective collars 18 as they are rotated by shaft 12 under no load or idling. Switch 34 is turned to "off" and shaft 12 rotated under load. The tape recorded signals are picked up by the respective heads 22 and 24 which are connected by leads to input terminals of electronic computer 14. Shaft 12 turns once to record and continuously to playback.

Figures 3, 4:
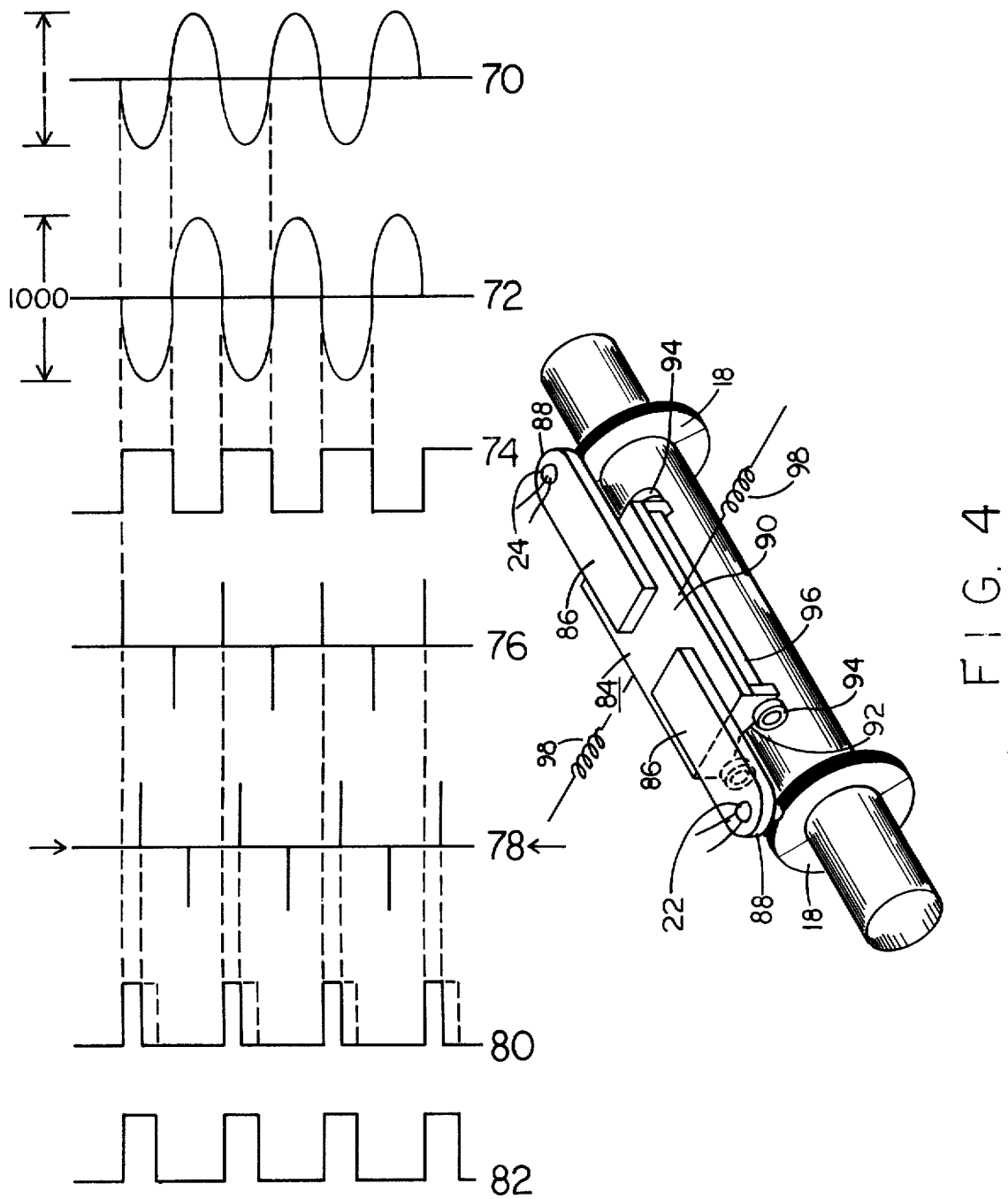
FIG. 3 is a series of wave forms of playback signals at different parts of the electronic circuitry of FIG. 2.
FIG. 4 is a three dimensional view of optional apparatus for eliminating readout errors due to drive shaft vibration.

Referring to FIGS. 2 and 3, electronic computer 14 comprises preamplifiers 36 and 38 that amplify the respective signals received from the heads. Since head 22 is nearer the source of power end of shaft 12 the signal from head 22 will lead the signal from head 24. From the preamplifiers, the signals go respectively to precision zero crossing detectors and limiters 40 and 42, and then through differentiators 44 and 46. The output of differentiator 44 (signal leading) drives the "set" input of a bi-stable gate 48, and the output of differentiator 46 (signal lagging) drives the "reset" input thereof. The output of said gate 48 has a width equal to the phase difference or time delay between zero crossing points of the signals. The output of said gate 48 goes to pulse-width-to-voltage converter 50 whose output is a d.c. voltage proportional to the torque on the shaft 12. The output of converter 50 drives torque meter 52 which can be either a digital or conventional panel meter. A potentiometer 54 can be used to calibrate the torque meter 52 for direct reading.

The output of differentiator 46 also drives a one shot multivibrator 56 whose output pulse rate is proportional to the shaft rotational speed. The frequency-to-voltage converter 58 provides a d.c. voltage proportional to said shaft rotational speed to drive a revolution per minute meter 60. A potentiometer 62 is connected for calibration for direct reading in r.p.m.

The torque voltage from converter 50 goes to the "X" input of a voltage multiplier 64, the r.p.m. voltage from converter 58 goes to the "Y" input thereof. The output of the multiplier is "X" times "Y", and therefore is proportional to the shaft horsepower. The output of multiplier 64 goes to a voltmeter 66 calibrated in horsepower for direct reading by means of a potentiometer 68.

FIG. 3 shows typical wave forms at various points in the computer 14. The wave form is typically sinusoidal, with a frequency chosen so that the maximum torque signal width measured by heads 22 and 24 is less than one cycle of the playback frequency. Referring to FIG. 3, the wave form from either head 22 or 24 is shown at line 70 and is the input into preamplifiers 36 and 38. The output from the preamplifiers is shown in line 72 which is squared and clipped by zero crossing detectors and limiters 40 and 42 as shown in line 74. Either above the line positive pulses or below the line negative pulses as shown in lines 76 and 78 supplied by differentiators 44 and 46 can be used for triggering bistable gate 48; differentiator 44 output shown on line 76 leads differentiator 46 output shown in line 78 by an amount proportional to the shaft torque. Bi-stable gate 48 output of positive waves as shown in line 80 of FIG. 3 are used and have the frequency of the original signal wave shown in line 70 of said figure, and a pulse width equal to a torque caused time delay between zero crossing points of the respective waves, and said pulse width is therefore proportional to the shaft torque. The output of the one shot multivibrator 56 is the revolution per minute wave train, as shown in line 82 of FIG. 3, also has the frequency of the original signal wave as shown in line 70, but has a fixed pulse width of less than one cycle at maximum revolutions per minute.

Referring to FIG. 4, a cradle 84 comprises a rigid structure 86 having oppositely disposed ends 88 and defining a level upper surface 90 extending longitudinally between said spaced apart collars 18 for positioning record playback heads 22 and 24, respectively mounted on said ends 88. A lower concave surface 92 is defined by said rigid structure 86 and rollers 94 are positioned thereunder for rotation on axles 96 mounted parallel to shaft 12, said rollers 94 for rollably engaging said shaft and spacing rigid structure 86 thereover. Cradle 84 is held by springs 98 from being displaced by the rotation of said shaft 12. Springs 98 are attached to opposite sides of rigid structure 86 and to any convenient fixed points adjacent said shaft and opposite thereto. The cradle is used for shafts having lateral or longitudinal vibrations or other non-rotational motions with respect to its bearing housings 28. In such cases, when record playback heads 22 and 24 are fixed to respective bearing housings 28, playback will include in the phase differences between tapes 20 a torque signal due to shaft twist and also signals caused by said lateral motions of shaft 12. By placing the heads on cradle 84 which follows any lateral motion of the shaft, signals caused by said lateral motion are eliminated and the errors caused thereby also eliminated from said phase differences.

What is claimed is:

1. An electronic transmission dynamometer, for determining torque, revolutions per minute, and horsepower of a rotating loaded shaft, comprising:
    a. audio signal generator means for generating periodic signals having a range of audio frequencies;
    b. separate recording mediums spaced axially apart and peripherally and non-magnetically applied on said shaft for rotation therewith;
    c. two record-playback heads fixed in spaced relationship to each other over said shaft and respectively adjacent said axially spaced apart recording mediums;
    d. a cradle adapted to ride on said rotating shaft and held from rotating therewith by flexible means transversely and oppositely connected to said cradle and respective fixed points for fixing said record-playback heads in said spaced relationship and respectively over said recording mediums;
    e. electronic means for sequentially amplifying, differentiating and converting said picked-up and playback signals into pulses having variable widths proportional to shaft torque, and fixed widths proportional to revolutions per minute of the shaft, and for converting said variable and fixed width pulses into voltages proportional to said shaft torque and revolutions per minute, and for multiplying said proportional voltages to obtain a voltage proportional to shaft horsepower; and
    f. voltmeter means, calibratible for direct readout in terms of horsepower, torque and revolutions per minute, for receiving and displaying reception results of said proportional voltages.

2. An electronic transmission dynamometer as described in claim 1 wherein said flexible means holding said cradle from rotation with said shaft are springs.

* * * * *